United States Patent
Dubois

(10) Patent No.: US 10,861,329 B2
(45) Date of Patent: Dec. 8, 2020

(54) SYSTEM FOR DETECTING THE PASSAGE OF A BICYCLE

(71) Applicant: ECO COMPTEUR, Lannion (FR)

(72) Inventor: Jean-Claude Dubois, Lannion (FR)

(73) Assignee: ECO COMPTEUR, Lannion (FR)

( * ) Notice: Subject to any disclaimer, the term of this patent is extended or adjusted under 35 U.S.C. 154(b) by 253 days.

(21) Appl. No.: 16/089,415

(22) PCT Filed: Mar. 28, 2017

(86) PCT No.: PCT/EP2017/057338
§ 371 (c)(1),
(2) Date: Sep. 28, 2018

(87) PCT Pub. No.: WO2017/167764
PCT Pub. Date: Oct. 5, 2017

(65) Prior Publication Data
US 2020/0302785 A1    Sep. 24, 2020

(30) Foreign Application Priority Data

Mar. 31, 2016 (FR) .................................. 16 52828

(51) Int. Cl.
*G08G 1/042* (2006.01)
*G01V 3/10* (2006.01)
*G08G 1/015* (2006.01)

(52) U.S. Cl.
CPC ............. *G08G 1/042* (2013.01); *G01V 3/105* (2013.01); *G08G 1/015* (2013.01)

(58) Field of Classification Search
CPC ......... G08G 1/042; G08G 1/015; G01V 3/105
(Continued)

(56) References Cited

U.S. PATENT DOCUMENTS

| 3,943,339 A * | 3/1976 | Koerner ................. G01V 3/101 377/9 |
| 2004/0056778 A1* | 3/2004 | Hilliard .................. G08G 1/042 340/933 |

(Continued)

FOREIGN PATENT DOCUMENTS

FR    2860327 A1    4/2005

OTHER PUBLICATIONS

Written Opinion in corresponding PCT Application No. PCT/EP2017/057338, dated May 29, 2017 (an English translation attached hereto).

(Continued)

*Primary Examiner* — Emily C Terrell
(74) *Attorney, Agent, or Firm* — Leason Ellis LLP

(57) ABSTRACT

The invention relates to a system for detecting the crossing of a vehicle, including:
a primary set of coils, of rank 1 to N and arranged in a particular layout,
a secondary set of coils, of rank 1 to N, arranged in the same particular layout,
a primary power supply and measurement device connected to each coil of the primary set so as to supply power to and measure the inductance of each coil,
a secondary power supply and measurement device connected to each coil of said secondary set so as to supply power to and measure the inductance of each coil, wherein each secondary power supply and measurement device is synchronized with the primary power supply and measurement device,
a storage device for recovering information relating to the number of vehicles detected by each set.

5 Claims, 3 Drawing Sheets

Figure 1:
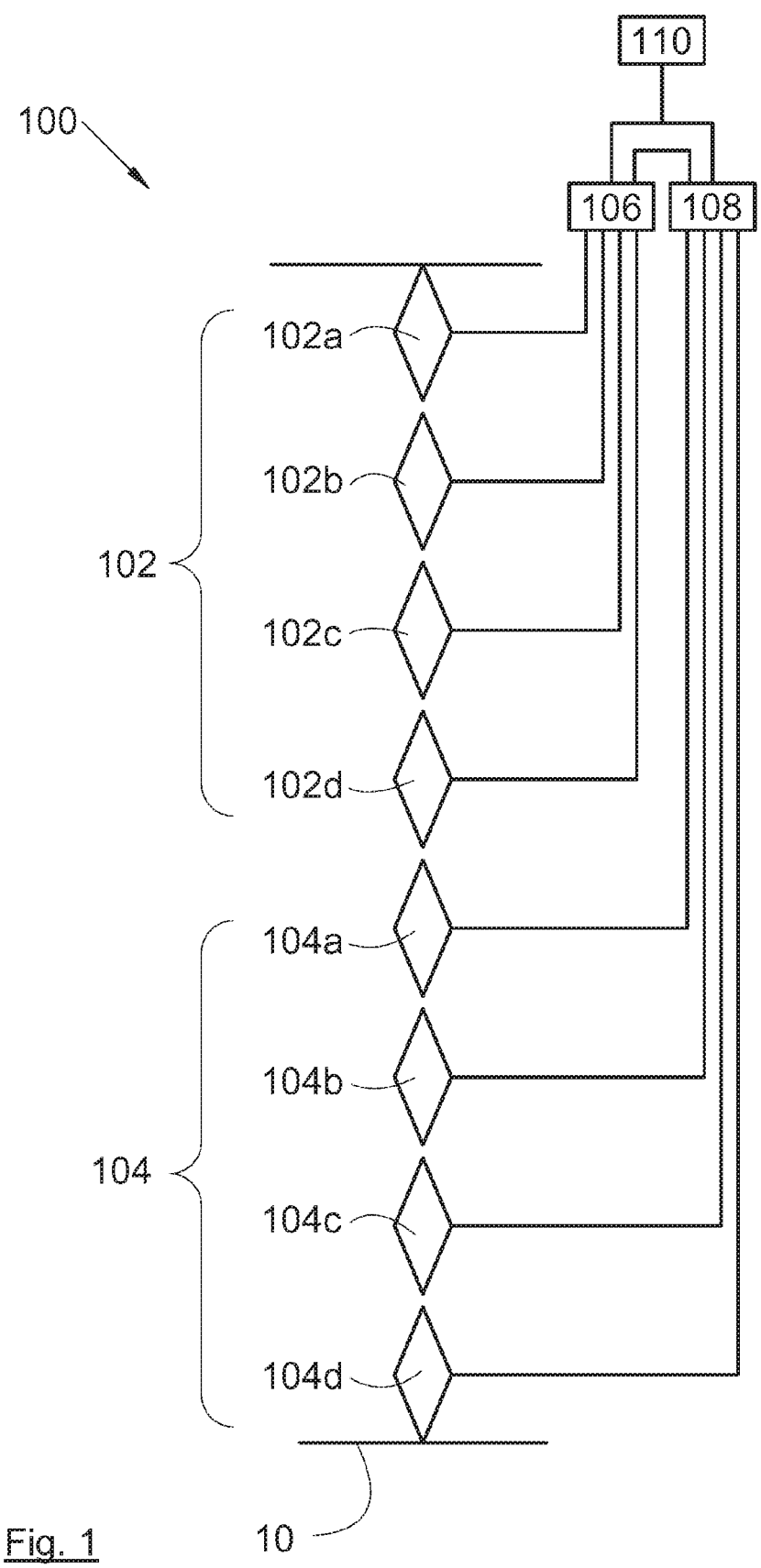

(58) Field of Classification Search
USPC .......................................................... 340/941
See application file for complete search history.

(56) References Cited

U.S. PATENT DOCUMENTS

| | | | | |
|---|---|---|---|---|
| 2006/0170567 | A1* | 8/2006 | Dalgleish | G08G 1/042 |
| | | | | 340/933 |
| 2008/0048888 | A1* | 2/2008 | Richley | G01D 5/204 |
| | | | | 340/941 |
| 2017/0358205 | A1* | 12/2017 | Ippolito | G08G 1/02 |

OTHER PUBLICATIONS

International Search Report in corresponding PCT Application No. PCT/EP2017/057338, dated May 29, 2017 (an English translation attached hereto).

* cited by examiner

SYSTEM FOR DETECTING THE PASSAGE OF A BICYCLE

CROSS-REFERENCE TO RELATED PATENT APPLICATIONS

This application is a U.S. National Stage Application under 35 U.S.C. § 371 of International Patent Application No. PCT/EP2017/057338, filed Mar. 28, 2017, which claims the benefit of priority under 35 U.S.C. Section 119(e) of French Patent Application number 1652828 filed Mar. 31, 2016, all of which are incorporated by reference in their entireties. The International Application was published on Oct. 5, 2017, as International Publication No. WO 2017/167764 A1.

The present invention relates to a system for detecting the crossing of a vehicle, particularly a two-wheeled vehicle, like a bicycle, to a counting system including such a detection system, and to a detection method implementing such a detection system.

To detect the crossing of a bicycle, it is known to use a detection system. Such a detection system includes a coil that is buried in the ground and forms a solenoid and a power supply and measurement device that is electrically connected to the coil so as to supply it with electric power and measure its inductance or any physical variable proportional to the inductance, such as for example the frequency of the RLC circuit, in which 'L' represents the inductance of the electromagnetic loop buried in the ground.

In the present description, the variation in inductance is measured, either directly by the difference between two inductances, or indirectly by the difference between two physical variables that are proportional to the inductance, such as for example the natural frequency of the coil. For each coil, measuring the variation in inductance consists in measuring the inductance, or the physical variable that is proportional thereto, when said coil is supplied with electric power, and in comparing it with a reference value of the inductance, or of the physical variable that is proportional thereto, which is measured without any disturbance, when no bicycle is present.

Depending on the comparison, it is then possible to deduce therefrom the presence, or lack thereof, of a bicycle. For example, if the measured value remains within an interval around the reference value, there is no bicycle, and if the measured value leaves the interval around the reference value, there is a bicycle.

The supply of electric power to the coil creates a magnetic field that is disturbed when a bicycle crosses above the coil, thus leading to a variation in the inductance thereof in comparison with the reference inductance without disturbance.

The power supply and measurement device then compares the measured inductance with the reference value and deduces therefrom the crossing, or lack thereof, of a bicycle.

The coil has limited dimensions that do not make it possible to cover the entire width of a traffic route using just one coil.

To solve this problem, it is known to arrange a plurality (generally 2, or even 4) of coils next to one another. When a coil is supplied with power, the magnetic field that it generates may lead to a variation in the inductance of the adjacent coils, thereby possibly leading to a false crossing detection.

In order to mitigate this problem, it is known to supply the coils with electric power one after the other and therefore to successively compare the inductance of each coil with its reference inductance.

Although such a detection system yields good results when the number of aligned coils is low (of the order of 4), that is to say as long as the width of the traffic route remains limited, it does not make it possible to correctly detect crossings when the traffic route becomes too wide. Specifically, with such a detection system comprising a large number of coils, the inactivity time of each coil becomes too long, thereby possibly leading to lack of detection even though a bicycle has crossed.

Document FR-A-2 860 327 discloses a bicycle crossing detection system using inductive loops.

One aim of the present invention is to propose a system for detecting the crossing of a vehicle, particularly a two-wheeled vehicle, like a bicycle that does not exhibit the drawbacks of the prior art and that makes it possible in particular to expand the area covered by the detection system without loss of detection.

To this end, a system for detecting the crossing of a vehicle, particularly a two-wheeled vehicle, like a bicycle is proposed, including:
- a primary set of coils, of rank 1 to N, where N>1, arranged in a particular layout,
- at least one secondary set of coils, of rank 1 to N, arranged in the same particular layout, and each coil of rank n ($1 \leq n \leq N$) of said secondary set is in the same location in the particular layout as the coil of the same rank n ($1 \leq n \leq N$) of the primary set,
- a primary power supply and measurement device connected electrically to each coil of the primary set so as to supply electric power successively to each of said coils with an activation period of T0 between two successive coils and measure their inductances and compare the measured inductances with reference inductances measured without disturbance,
- for each secondary set, a secondary power supply and measurement device connected electrically to each coil of said secondary set so as to supply electric power successively to each of said coils with the activation period of T0 between two successive coils and measure their inductances and compare the measured inductances with reference inductances measured without disturbance, and
- a storage device connected to the primary power supply and measurement device and to each secondary power supply and measurement device, and designed to regularly recover information relating to the number of vehicles detected by each set, said detection system being characterized in that each secondary power supply and measurement device is synchronized with the primary power supply and measurement device so as to supply power simultaneously to the coil of rank 1 of the primary set and the coil of rank 1 of each secondary set.

According to one particular embodiment, the particular layout is a row of four coils.

According to one particular embodiment, the particular layout is a rectangle of four coils.

The invention also proposes a counting system including a detection system according to one of the preceding variants, wherein the storage device records the total number of vehicles detected by the detection system.

The invention also proposes a detection method implemented by a detection system according to one of the preceding variants, the method including:
- an initialization step, during which the primary power supply and measurement device initializes a rank n at 1,
- a synchronization step, during which the primary power supply and measurement device sends a synchronization signal to each secondary power supply and measurement device,
- an activation step, during which the primary power supply and measurement device and each secondary power supply and measurement device simultaneously activate the coil of rank 1 of the primary set and the coil of rank 1 of each secondary set,
- an overall step of maintaining activation, during which the primary power supply and measurement device and each secondary power supply and measurement device maintain the activation of each coil of rank 1 during the period TO,
- an overall deactivation step, during which the primary power supply and measurement device and each secondary power supply and measurement device deactivate each coil of rank 1,
- an incrementation step, during which the primary power supply and measurement device and each secondary power supply and measurement device increment the rank n by 1,
- an activation step, during which the primary power supply and measurement device and each secondary power supply and measurement device activate the coil of rank n of the primary set and the coil of rank n of each secondary set,
- a step of maintaining activation, during which the primary power supply and measurement device and each secondary power supply and measurement device maintain the activation of each coil of rank n during the period TO,
- a deactivation step, during which the primary power supply and measurement device and each secondary power supply and measurement device deactivate each coil of rank n,
- a test step, during which the primary power supply and measurement device and the secondary power supply and measurement device compare the rank n with N,
  - if n=N, the method loops back to the initialization step,
  - if n<N, the method loops back to the incrementation step.

Figure 2:
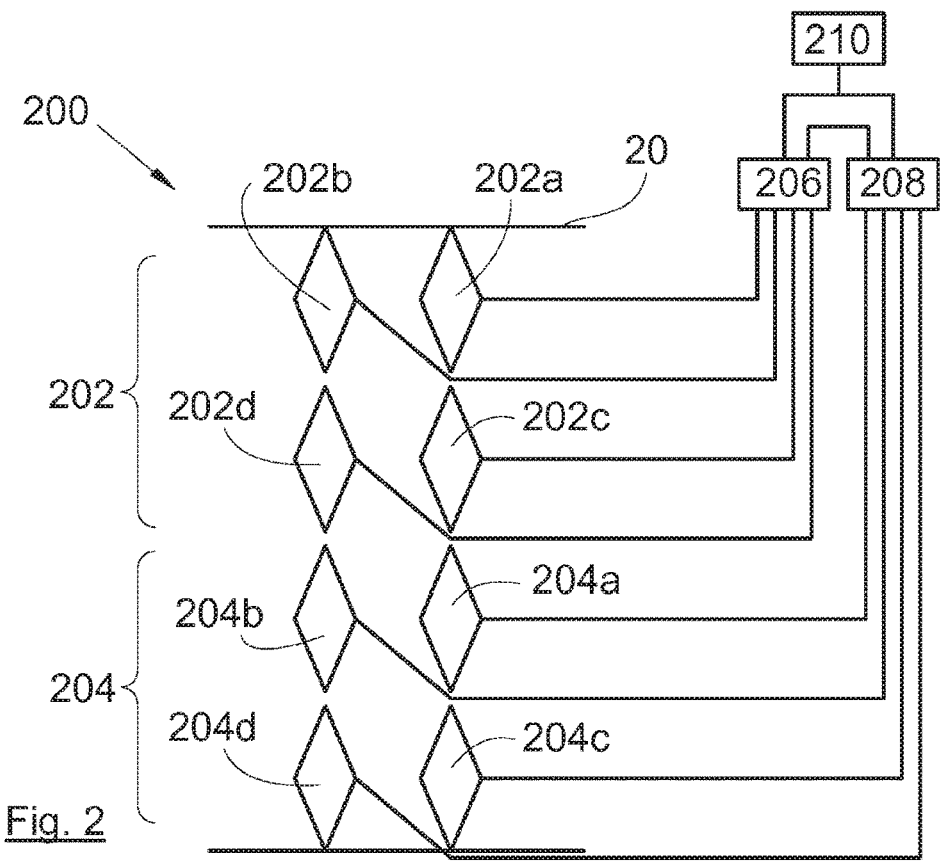
Figure 3:
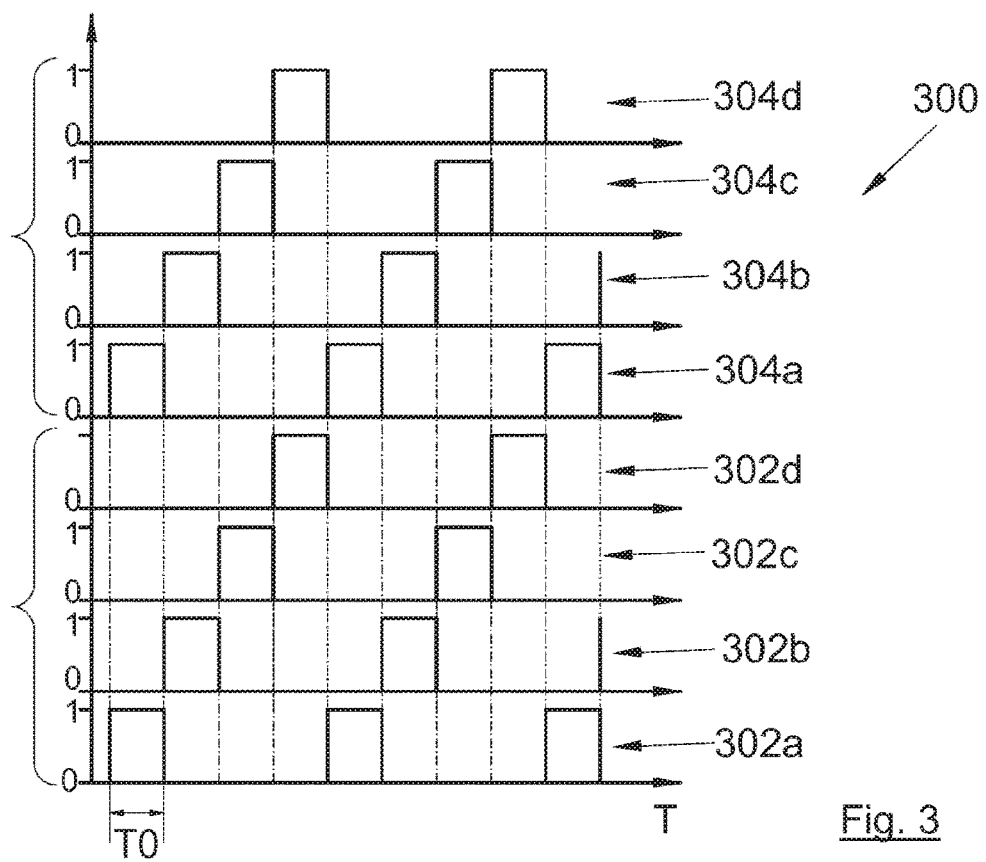
Figure 4:
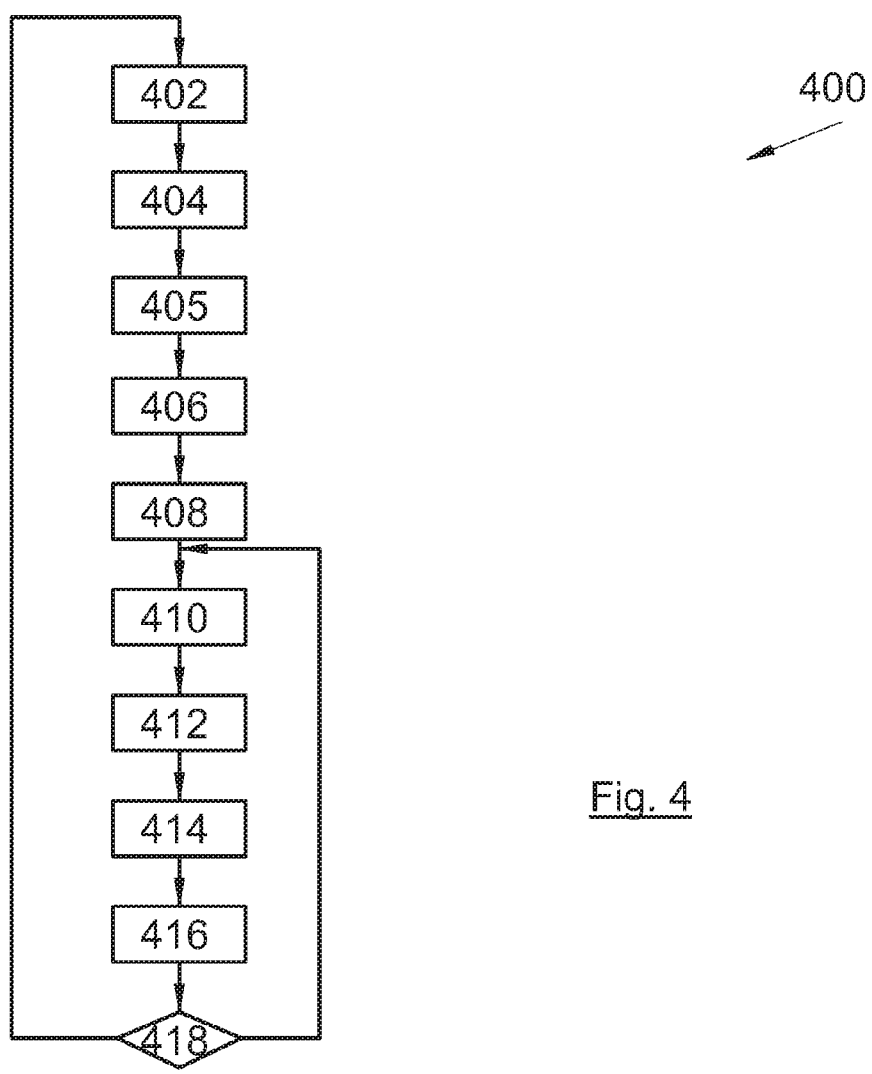
Figure 5:
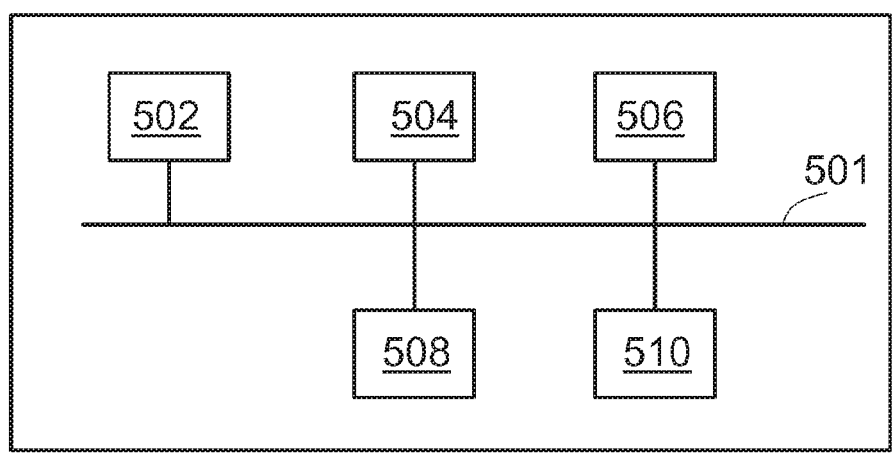

The features of the invention that are mentioned above, along with others, will emerge more clearly upon reading the following description of an exemplary embodiment, said description being given with reference to the appended drawings, in which:

FIG. 1 shows a plan view of a detection system according to a first embodiment of the invention, FIG. 2 shows a plan view of a detection system according to a second embodiment of the invention, FIG. 3 shows a timing diagram of the activation of the coils of the detection system according to the invention, FIG. 4 shows a flowchart of a detection method according to the invention, and FIG. 5 shows a control unit.

The invention is more particularly described for a bicycle, but it can be applied in the same manner for other vehicles, particularly two-wheeled vehicles.

FIG. 1 shows a detection system 100 that is arranged so as to detect the crossings of bicycles on a traffic route 10.

The detection system 100 comprises:
- a primary set 102 of four coils 102a-d,
- a secondary set 104 of four coils 104a-d,
- a primary power supply and measurement device 106 connected electrically to each coil 102a-d of the primary set 102 so as to supply electric power to each of said coils 102a-d and measure their inductances and compare the measured inductances with reference inductances measured without disturbance,
- a secondary power supply and measurement device 108 connected electrically to each coil 104a-d of the secondary set 104 so as to supply electric power to each of said coils 104a-d and measure their inductances and compare the measured inductances with reference inductances measured without disturbance,
- a storage device 110 connected to the primary power supply and measurement device 106 and to the secondary power supply and measurement device 108.

The coils 102a-d and 104a-d are all aligned so as to cover the entire width of the traffic route 10. The coils 102a-d of the primary set 102 are first of all aligned next to one another in the direction of the width of the traffic route 10, and then the coils 104a-d of the secondary set 104 are subsequently aligned next to one another in the direction of the width of the traffic route 10, and in which the first coil 104a of the secondary set 104 is arranged following the last coil 102d of the primary set 102 in the direction of the width of the traffic route 10.

FIG. 2 shows a detection system 200 that is arranged so as to detect the crossings of bicycles and their crossing directions on a traffic route 20.

The detection system 200 comprises:
- a primary set 202 of four coils 202a-d,
- a secondary set 204 of four coils 204a-d,
- a primary power supply and measurement device 206 connected electrically to each coil 202a-d of the primary set 202 so as to supply electric power to each of said coils 202a-d and measure their inductances and compare the measured inductances with reference inductances measured without disturbance,
- a secondary power supply and measurement device 208 connected electrically to each coil 204a-d of the secondary set 204 so as to supply electric power to each of said coils 204a-d and measure their inductances and compare the measured inductances with reference inductances measured without disturbance,
- a storage device 210 connected to the primary power supply and measurement device 206 and to the secondary power supply and measurement device 208.

The coils 202a-d and 204a-d of each set 202, 204 are distributed in two pairs of coils, namely the coils 202a-b, respectively 204a-b, and the coils 202c-d, respectively 204c-d. The two pairs of one and the same set 202, 204 are arranged one behind the other in a traffic direction of the traffic route 20. The two sets 202 and 204 are aligned so as to cover the entire width of the traffic route 20.

Generally, each set 102, 104, 202, 204 includes one and the same number N (N>1) of coils of rank 1 to N, and the coils 102a-d, 104a-d, 202a-d and 204a-d of each set 102, 104, 202, 204 are arranged in one and the same particular layout that is based on the step-by-step repetition of one and the same repetitive pattern, either a row of four coils 102a-d, 104a-d, 202a-d and 204a-d in the embodiment of FIG. 1, or a rectangle of four coils 102a-d, 104a-d, 202a-d and 204a-d in the embodiment of FIG. 2. In the embodiments of FIGS. 1 and 2, each coil takes the form of a rhombus, but it could take another form.

The two coils 102*a-d*, 104*a-d*, 202*a-d* and 204*a-d* of the same rank n (1≤n≤N) of each set 102, 104, 202, 204 are arranged at the same location in the particular layout.

The primary power supply and measurement device 106, 206 is designed to sequentially supply electric power to each coil 102*a-d*, 202*a-d* of the primary set 102, 202, and to measure the inductance of each coil 102*a-d*, 202*a-d* thus supplied with power and compare the inductance thus measured with the reference inductance of said coil 102*a-d*, 202*a-d*. There is thus a single coil 102*a-d*, 202*a-d* of the primary set 102, 202 that is activated at a given moment.

The secondary power supply and measurement device 108, 208 is designed to sequentially supply electric power to each coil 104*a-d*, 204*a-d* of the secondary set 104, 204, and to measure the inductance of each coil 104*a-d*, 204*a-d* thus supplied with power and compare the inductance thus measured with the reference inductance of said coil 104*a-d*, 204*a-d*. There is thus a single coil 104*a-d*, 204*a-d* of the secondary set 104, 204 that is activated at a given moment.

FIG. 3 shows a timing diagram 300 of the activation of the coils 102*a-d* and 104*a-d* for the embodiment of FIG. 1, but the timing diagram is identical for the embodiment of FIG. 2. The ordinate axis shows the time T.

Each row of the timing diagram 300 shows the activation sequence of a coil, namely:
- row 302*a* represents the activation sequence of a coil 102*a*,
- row 302*b* represents the activation sequence of a coil 102*b*,
- row 302*c* represents the activation sequence of a coil 102*c*,
- row 302*d* represents the activation sequence of a coil 102*d*,
- row 304*a* represents the activation sequence of a coil 104*a*,
- row 304*b* represents the activation sequence of a coil 104*b*,
- row 304*c* represents the activation sequence of a coil 104*c*, and
- row 304*d* represents the activation sequence of a coil 104*d*.

Rows 302*a-d* are therefore the activation sequences managed by the primary power supply and measurement device 106, 206. Rows 304*a-d* are therefore the activation sequences managed by the secondary power supply and measurement device 108, 208.

The timing diagram 300 shows that the coils 102*a-d* of the primary set 102 are activated by the primary power supply and measurement device 106 one after the other, starting from the coil of rank 1 (in this case the coil 102*a*), and that the cycle restarts after each coil 102*a-d* has been activated and then deactivated. The period between the activation of two successive coils 102*a-d* is denoted TO and is of the order of 3 ms.

In the same way, the timing diagram 300 shows that the coils 104*a-d* of the secondary set 104 are activated one after the other, starting from the coil of rank 1 (in this case the coil 104*a*), and that the cycle restarts after each coil 104*a-d* has been activated and then deactivated. The period between the activation of two successive coils 104*a-d* is also TO.

When a coil 102*a-d*, 104*a-d*, 202*a-d*, 204*a-d* is activated, the associated power supply and measurement device (106, 108, 206, 208) measures the inductance of said coil, thereby enabling it, by analyzing the variation in inductance with the reference inductance, to determine and record the crossing, or lack thereof, of a bicycle above said coil.

The primary power supply and measurement device 106, 206 and the secondary power supply and measurement device 108, 208 are synchronized so as to simultaneously activate the coil of rank 1 102*a*, 202*a* of the primary set 102, 202 and the coil of rank 1 104*a*, 204*a* of the secondary set 104, 204 each time the power supply and measurement devices 106, 206, 108 and 208 activate said coils of rank 1 102*a*, 104*a*, 202*a*, 204*a*, that is to say upon each start of an activation cycle. This synchronization is performed by the emission of a synchronization signal from the primary power supply and measurement device 106, respectively 206, to the secondary power supply and measurement device 108, respectively 208.

According to one particular embodiment, the synchronization, for the primary power supply and measurement device 106, 206, consists in emitting, upon each activation of the associated coil of rank 1 102*a*, 202*a*, an activation signal representative of the fact that said coil of rank 1 102*a*, 202*a* is activated and, for the secondary power supply and measurement device 108, 208, consists in receiving this activation signal and in activating its associated coil of rank 1 104*a*, 204*a* upon reception of this activation signal.

The other coils are then considered to be synchronized as they are activated successively after the period TO.

Each time the coil 102*a*, 202*a*, 104*a*, 204*a* is activated, synchronization is performed again, thus preventing drift over time.

This synchronization makes it possible to activate the coils 102*a-d*, 202*a-d*, 104*a-d*, 204*a-d* according to their layouts and makes it possible to cover a larger area without the risk of losing crossing information.

The storage device 110, 210 is designed to regularly recover information relating to the number of bicycles detected by the primary power supply and measurement device 106, respectively 206, and the secondary power supply and measurement device 108, respectively 208. The primary power supply and measurement device 106, 206 and the secondary power supply and measurement device 108, 208 are linked to the storage device 110, 210 by a communication bus.

The storage device 110, 210 thus records the total number of bicycles detected and is able to transmit this information to a monitoring center.

Each primary power supply and measurement device 106, 206, each secondary power supply and measurement device 108, 208 and each storage device 110, 210 preferably take the form of a control unit 500 shown schematically in FIG. 5.

The control unit 500 comprises for example, linked by a communication bus 501: a processor 502 or CPU (central processing unit); a random access memory RAM 504; a read-only memory ROM 506; a storage unit such as an SPI memory 508; at least one communication interface 510, allowing the control unit 500 of the storage device 110, 210 for example to communicate with the control units 500 of the power supply and measurement devices 106 and 108 (respectively 206 and 208).

The processor 502 is capable of executing instructions loaded in the RAM from the ROM, from an external memory (not shown), or from a storage medium (such as an SD card). When the device is powered up, the processor is capable of reading instructions from the RAM and of executing them. These instructions form a computer program that brings about the implementation, by the processor, of all or some of the algorithms and steps described with reference to FIG. 4.

All or some of the algorithms and steps described hereinafter may be implemented in software form through the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

The inductance measurements and the comparisons with the reference inductances and the recording of the number of bicycles are performed by the processors 502 of the power supply and measurement devices 106, 206, 108, 208.

FIG. 4 shows a flow chart of a detection method 400 using one or the other of the detection systems 100, 200 described above. The method includes:

- an initialization step 402, during which the primary power supply and measurement device 106, 206 initializes a rank n at 1,
- a synchronization step 404, during which the primary power supply and measurement device 106, 206 sends a synchronization signal to the secondary power supply and measurement device 108, 208,
- an activation step 405, during which the primary power supply and measurement device 106, 206 and the secondary power supply and measurement device 108, 208 simultaneously activate the coil of rank 1 102a, 202a of the primary set 102, 202 and the coil of rank 1 104a, 204a of the secondary set 104, 204,
- an overall step 406 of maintaining activation, during which the primary power supply and measurement device 106, 206 and the secondary power supply and measurement device 108, 208 maintain the activation of each coil of rank 1 during the period TO,
- an overall deactivation step 408, during which the primary power supply and measurement device 106, 206 and the secondary power supply and measurement device 108, 208 deactivate each coil of rank 1,
- an incrementation step 410, during which the primary power supply and measurement device 106, 206 and the secondary power supply and measurement device 108, 208 increment the rank n of the coil to be activated,
- an activation step 412, during which the primary power supply and measurement device 106, 206 and the secondary power supply and measurement device 108, 208 activate the coil of rank n 102c-d, 202c-d of the primary set 102, 202 and the coil of rank n 104c-d, 204c-d of the secondary set 104, 204,
- a step 414 of maintaining activation, during which the primary power supply and measurement device 106, 206 and the secondary power supply and measurement device 108, 208 maintain the activation of each coil of rank n during the period TO,
- a deactivation step 416, during which the primary power supply and measurement device 106, 206 and the secondary power supply and measurement device 108, 208 deactivate each coil of rank n,
- a test step 418, during which the primary power supply and measurement device 106, 206 and the secondary power supply and measurement device 108, 208 compare the rank n with N,
    - if n=N, the method loops back to the initialization step 402,
    - if n<N, the method loops back to the incrementation step 410.

The inductance measurement of each coil and the comparison with its reference inductance are performed when this coil is activated.

Each detection system 100, 200 described above may be integrated into a counting system including said detection system 100, 200, in which the storage device 110, 210 records the number of bicycles detected by the detection system 100, 200.

In each embodiment of the invention presented here, there is a single secondary set, 104 or 204, but there may be a plurality thereof, so as to cover the entire crossing zone of the bicycles. In each secondary set, each coil of rank 'n' is arranged in the same layout as the coil of rank 'n' of the primary set, and each coil of rank 'n' will be activated synchronously.

The detection system then has, for each secondary set, an associated secondary power supply and measurement device in accordance with the one already described for the secondary set 104, and the storage device is then connected to each power supply and measurement device (primary and secondary) so as to recover information relating to the number of bicycles detected. For synchronization, the primary power supply and measurement device 106, 206 sends a synchronization signal to each secondary power supply and measurement device 108, 208, either directly or step-by-step. It is thus possible to expand the scope of the detection system to 12, 16, etc. coils.

In the case of FIG. 1, the additional coils are situated following the secondary set 104.

In the same way, for FIG. 2, it is possible to arrange further secondary sets laid out in a rectangle following the secondary set 204.

The invention claimed is:

1. A system (100, 200) for detecting the crossing of a vehicle, particularly a two-wheeled vehicle, including:
    - a primary set (102, 202) of coils (102a-d, 202a-d), of rank 1 to N, where N>1, arranged in a particular layout,
    - at least one secondary set (104, 204) of coils (104a-d, 204a-d), of rank 1 to N, arranged in the same particular layout, and each coil (104a-d, 204a-d) of rank n (1<n<N) of said secondary set (104, 204) is in the same location in the particular layout as the coil (102a-d, 202a-d) of the same rank n (1<n<N) of the primary set (102, 202),
    - a primary power supply and measurement device (106, 206) connected electrically to each coil (102a-d, 202a-d) of the primary set (102, 202) so as to supply electric power successively to each of said coils (102a-d, 202a-d) with an activation period of TO between two successive coils and measure their inductances and compare the measured inductances with reference inductances measured without disturbance,
    - for each secondary set (104, 204), a secondary power supply and measurement device (108, 208) connected electrically to each coil (104a-d, 204a-d) of said secondary set (104, 204) so as to supply electric power successively to each of said coils (104a-d, 204a-d) with the activation period of TO between two successive coils and measure their inductances and compare the measured inductances with reference inductances measured without disturbance, and
    - a storage device (110, 210) connected to the primary power supply and measurement device (106, 206) and to each secondary power supply and measurement device (108, 208), and designed to regularly recover information relating to the number of vehicles detected by each primary and secondary coil set (102, 202, 104, 204), said detection system (100, 200) being characterized in that each secondary power supply and measurement device (108, 208) is synchronized with the primary power supply and measurement device (106, 206) so as to supply power simultaneously to the coil of rank 1 (102*a*, 202*a*) of the primary set (102, 202) and the coil of rank 1 (104*a*, 204*a*) of each secondary set (104, 204).

2. The detection system (100) as claimed in claim 1, wherein the particular layout is a row of four coils (102*a-d*, 104*a-d*).

3. The detection system (200) as claimed in claim 1, wherein the particular layout is a rectangle of four coils (202*a-d*, 204*a-d*).

4. A counting system including a detection system (100, 200) as claimed in claim 1, wherein the storage device (110, 210) records the total number of vehicles detected by the detection system (100, 200).

5. A detection method (400) implemented by a detection system (100, 200) as claimed in claim 1, the method including:

an initialization step (402), during which the primary power supply and measurement device (106, 206) initializes a rank n at 1, a synchronization step (404), during which the primary power supply and measurement device (106, 206) sends a synchronization signal to each secondary power supply and measurement device (108, 208), an activation step (405), during which the primary power supply and measurement device (106, 206) and each secondary power supply and measurement device (108, 208) simultaneously activate the coil of rank 1 (102*a*, 202*a*) of the primary set (102, 202) and the coil of rank 1 (104*a*, 204*a*) of each secondary set (104, 204), an overall step (406) of maintaining activation, during which the primary power supply and measurement device (106, 206) and each secondary power supply and measurement device (108, 208) maintain the activation of each coil of rank 1 during the period TO, an overall deactivation step (408), during which the primary power supply and measurement device (106, 206) and each secondary power supply and measurement device (108, 208) deactivate each coil of rank 1, an incrementation step (410), during which the primary power supply and measurement device (106, 206) and each secondary power supply and measurement device (108, 208) increment the rank n by 1, an activation step (412), during which the primary power supply and measurement device (106, 206) and each secondary power supply and measurement device (108, 208) activate the coil of rank n (102*c-d*, 202*c-d*) of the primary set (102, 202) and the coil of rank n (104*c-d*, 204*c-d*) of each secondary set (104, 204), a step (414) of maintaining activation, during which the primary power supply and measurement device (106, 206) and each secondary power supply and measurement device (108, 208) maintain the activation of each coil of rank n during the period TO, a deactivation step (416), during which the primary power supply and measurement device (106, 206) and each secondary power supply and measurement device (108, 208) deactivate each coil of rank n, a test step (418), during which the primary power supply and measurement device (106, 206) and the secondary power supply and measurement device (108, 208) compare the rank n with N, if n=N, the method loops back to the initialization step (402), if n<N, the method loops back to the incrementation step (410).

* * * * *